US009411958B2

(12) United States Patent
Wang et al.

(10) Patent No.: US 9,411,958 B2
(45) Date of Patent: Aug. 9, 2016

(54) POLYMORPHIC TREATMENT OF DATA ENTERED AT CLIENTS

(71) Applicant: Shape Security Inc., Palo Alto, CA (US)

(72) Inventors: Xinran Wang, San Ramon, CA (US); Yao Zhao, Fremont, CA (US)

(73) Assignee: Shape Security, Inc., Palo Alto, CA (US)

( * ) Notice: Subject to any disclaimer, the term of this patent is extended or adjusted under 35 U.S.C. 154(b) by 0 days.

(21) Appl. No.: 14/286,733

(22) Filed: May 23, 2014

(65) Prior Publication Data

US 2015/0339479 A1    Nov. 26, 2015

(51) Int. Cl.
| | |
|---|---|
| H04L 29/06 | (2006.01) |
| G06F 21/55 | (2013.01) |
| G06F 17/24 | (2006.01) |
| G06F 21/14 | (2013.01) |

(52) U.S. Cl.
CPC ............ *G06F 21/556* (2013.01); *G06F 17/243* (2013.01); *G06F 21/14* (2013.01); *H04L 63/14* (2013.01); *H04L 63/0281* (2013.01); *H04L 2463/144* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 6,938,170 | B1* | 8/2005 | Kraft | G06F 17/3089 707/999.005 |
| 7,117,429 | B2 | 10/2006 | Vedullapalli et al. | |
| 7,480,385 | B2 | 1/2009 | Weber | |
| 7,500,099 | B1 | 3/2009 | McElwee et al. | |
| 7,640,583 | B1* | 12/2009 | Marinescu | G06F 21/55 713/187 |
| 7,707,223 | B2 | 4/2010 | Zubenko et al. | |
| 7,836,425 | B2 | 11/2010 | Rubin et al. | |

(Continued)

FOREIGN PATENT DOCUMENTS

| | | |
|---|---|---|
| GB | 2443093 | 4/2008 |
| WO | 9964967 | 12/1999 |

(Continued)

OTHER PUBLICATIONS

Anderson et al., "Measuring the Cost of Cybercrime," 2012 Workshop on the Economics of Information Security (WEIS), [retrieved on Oct. 15, 2013]. Retrieved from the Internet: <URL: http://web.archive.org/web/20130623080604/http://weis2012.econinfosec.org/papers/Anderson_WEIS2012.pdf>, 31 pages, Jun. 2012.

(Continued)

*Primary Examiner* — Harris C Wang
(74) *Attorney, Agent, or Firm* — Fish & Richardson P.C.

(57) ABSTRACT

A computer-implemented method includes identifying, in web code to be served to a client, presence of code for generating a form; generating additional, executable code to be run on the client device, the additional, executable code being arranged to identify user input on the client device and modify the form so that data from the user input is received into one or more alternative fields of the form other than a first field to which a user performing the input directed the input; receiving a request from the client device based on completion of input into the form; and converting data from the received request so that data for the one or more alternative fields of the form is directed to the first field of the form for processing by a web server system that initially generated the web code.

23 Claims, 5 Drawing Sheets

(56) References Cited

U.S. PATENT DOCUMENTS

| | | | |
|---|---|---|---|
| 7,975,308 B1 | 7/2011 | Satish et al. | |
| 8,020,193 B2 | 9/2011 | Bhola et al. | |
| 8,170,020 B2 | 5/2012 | Oliver et al. | |
| 8,200,958 B2 | 6/2012 | Coppola et al. | |
| 8,225,401 B2 | 7/2012 | Sobel et al. | |
| 8,266,202 B1 | 9/2012 | Colton et al. | |
| 8,332,952 B2 | 12/2012 | Zhang et al. | |
| 8,347,396 B2 | 1/2013 | Grigsby et al. | |
| 8,527,774 B2 | 9/2013 | Fallows et al. | |
| 8,533,480 B2 | 9/2013 | Pravetz et al. | |
| 2002/0016918 A1* | 2/2002 | Tucker | G06F 21/14 713/190 |
| 2004/0117654 A1* | 6/2004 | Feldman | G06F 21/6218 726/22 |
| 2004/0245525 A1 | 12/2004 | Yamazaki et al. | |
| 2006/0242687 A1* | 10/2006 | Thione | G06F 21/445 726/4 |
| 2007/0011295 A1 | 1/2007 | Hansen | |
| 2007/0039048 A1* | 2/2007 | Shelest | G06F 21/566 726/22 |
| 2007/0074227 A1 | 3/2007 | Naidu et al. | |
| 2008/0222736 A1* | 9/2008 | Boodaei | G06F 21/128 726/27 |
| 2009/0099988 A1 | 4/2009 | Stokes et al. | |
| 2009/0193513 A1* | 7/2009 | Agarwal et al. | 726/15 |
| 2009/0249310 A1 | 10/2009 | Meijer et al. | |
| 2009/0282062 A1 | 11/2009 | Husic | |
| 2010/0100927 A1 | 4/2010 | Bhola et al. | |
| 2010/0235637 A1 | 9/2010 | Lu et al. | |
| 2010/0235910 A1 | 9/2010 | Ku et al. | |
| 2010/0257354 A1* | 10/2010 | Johnston | G06F 21/6209 713/153 |
| 2010/0262780 A1 | 10/2010 | Mahan et al. | |
| 2010/0287132 A1* | 11/2010 | Hauser | G06F 17/241 706/52 |
| 2011/0015917 A1 | 1/2011 | Wang et al. | |
| 2011/0022846 A1 | 1/2011 | Ginter et al. | |
| 2011/0107077 A1* | 5/2011 | Henderson | G06F 21/14 713/150 |
| 2011/0131416 A1 | 6/2011 | Schneider | |
| 2011/0154021 A1 | 6/2011 | McCann et al. | |
| 2011/0178973 A1 | 7/2011 | Lopez et al. | |
| 2011/0296391 A1 | 12/2011 | Gass et al. | |
| 2012/0011262 A1 | 1/2012 | Cheng et al. | |
| 2012/0022942 A1 | 1/2012 | Holloway et al. | |
| 2012/0096116 A1 | 4/2012 | Mislove et al. | |
| 2012/0124372 A1* | 5/2012 | Dilley | H04L 67/2819 713/162 |
| 2013/0073853 A1* | 3/2013 | Ford | H04L 63/1466 713/168 |
| 2013/0198607 A1 | 8/2013 | Mischook et al. | |
| 2013/0232234 A1 | 9/2013 | Kapur et al. | |
| 2013/0238691 A1* | 9/2013 | Lin | H04L 67/42 709/203 |
| 2013/0263264 A1 | 10/2013 | Klein et al. | |
| 2014/0040787 A1 | 2/2014 | Mills et al. | |
| 2014/0089786 A1 | 3/2014 | Hashmi | |
| 2014/0281535 A1 | 9/2014 | Kane et al. | |

FOREIGN PATENT DOCUMENTS

| | | |
|---|---|---|
| WO | 0072119 | 11/2000 |
| WO | 02088951 | 11/2002 |
| WO | 02093369 | 11/2002 |
| WO | 2004109532 | 12/2004 |
| WO | 2008095018 | 8/2008 |
| WO | 2008095031 | 8/2008 |
| WO | 2008130946 | 10/2008 |
| WO | WO2010/046314 | 4/2010 |
| WO | 2013091709 | 6/2013 |

OTHER PUBLICATIONS

CodeSealer, "CodeSealer," codesealer.com [online] 2013 [captured Aug. 29, 2013]. Retrieved from the Internet: <URL: http://web.archive.org/web/20130829165031/http://codesealer.com/technology.html>, 2 pages.

Cova et al., "Detection and Analysis of Drive-by-Download Attacks and Malicious JavaScript Code," World Wide Web Conference Committee, Apr. 26-30, 2010. Retrieved from the Internet: <URL: http://www.cs.ucsb.edu/~vigna/publications/2010_cova_kruegel_vigna_Wepawet.pdf>, 10 pages.

Currie et al., "In-the-wire authentication: Protecting client-side critical data fields in secure network transactions," $2^{nd}$ International Conference on Adaptive Science and Technology, 2009, pp. 232-237.

Dougan et al., "Man in the browser attacks," International Journal of Ambient Computing and Intelligence, Jan.-Mar. 2012, pp. 29-39.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclab.tuwien.ac.at/papers/driveby.pdf>, 19 pages, 2009.

Entrust, "Defeating Man-in-the-Browser Malware," Entrust.com [online] Sep. 2012 [retrieved Oct. 15, 2013]. Retrieved from the Internet: <URL: http://download.entrust.com/resources/download.cfm/24002/>, 18 pages.

Marcus and Sherstobitoff, "Dissecting Operation High Roller," McAfee [online] 2012 [retrieved on Oct. 15, 2013]. Retrieved from the Internet: <URL: http://www.mcafee.com/us/resources/reports/rp-operation-high-roller.pdf>, 20 pages.

Oh, "Recent Java exploitation trends and malware," Black Hat USA 2012, Retrieved from the Internet: <URL: https://media.blackhat.com/bh-us-12/Briefings/Oh/BH_US_12_Oh_Recent_Java_Exploitation_Trends_and_Malware_WP.pdf>, 27 pages.

RSA, "RSA Offers Advanced Solutions to Help Combat Man-In-The-Browser Attacks," rsa.com [online] May 18, 2010 [captured Nov. 11, 2011]. Retrieved from the Internet: <URL: http://web.archive.org/web/20111111123108/http://rsa.com/press_release.aspx?id=10943>, 3 pages.

Rutkowska, "Rootkits vs. Stealth by Design Malware," Black Hat Europe, 2006. Retrieved from the Internet: <URL: http://www.blackhat.com/presentations/bh-europe-06/bh-eu-06-Rutkowska.pdf> 44 pages.

SafeNet, "Prevent Financial Fraud and Man-in-the-Browser Attacks," safenet-inc.com [online] [retrieved on Oct. 15, 2013]. Retrieved from the Internet: <URL: http://www.safenet-inc.com/solutions/data-protection/financial-services/financial-fraud-man-in-the-browser-attacks/>, 1 page.

Sood and Enbody, "A Browser Malware Taxonomy," *Virus Bulletin*, Jun. 2011. Retrieved from the Internet: <URL: http://www.secniche.org/released/VB_BRW_MAL_TAX_AKS_RJE.pdf>, 5 pages.

Sood and Enbody, "Browser Exploit Packs—Exploitation Tactics," Virus Bulletin Conference, Oct. 2011, Retrieved from the Internet: <URL: http://www.secniche.org/papers/VB_2011_BRW_EXP_PACKS_AKS_RJE.pdf>, 9 pages.

Sood et al., "The Art of Stealing Banking Information—Form grabbing on Fire," *Virus Bulletin*, Nov. 2011, Retrieved from the Internet: <URL: http://www.virusbtn.com/virusbulletin/archive/2011/11/vb201111-form-grabbing>, 5 pages.

Team Cymru, "Cybercrime—an Epidemic," *Queue*, 4(9):24-35, Nov. 2006, Retrieved from the Internet: <URL: http://trygstad.rice.iit.edu:8000/Articles/Cybercrime%20-%20An%20Epidemic%20-%20ACM%20Queue.pdf>, 3 pages.

Trusteer, "Trusteer Rapport for Online Banking," [online] 2013 [captured May 11, 2013]. Retrieved from the Internet: <URL: http://web.archive.org/web/20130511162210/http://www.trusteer.com/products/trusteer-rapport-for-online-banking>, 2 pages.

Vasco, "Hardened Browser," vasco.com [online] [retrieved on Oct. 15, 2013]. Retrieved from the Internet: <URL: http://www.vasco.com/products/client_products/pki_digipass/hardened_browser.aspx>, 2 pages.

(56) References Cited

OTHER PUBLICATIONS

International Search Report and Written Opinion for PCT Application No. PCT/US2015/031361, dated Jul. 28, 2015, 13 pages.

Li et al., "WebShield: Enabling various web defense techniques without client side modifications," In Proceedings of the 18th Annual Network and Distributed System Security Symposium (NDSS), 2011, 18 pages.

Matsunaka et al., "Detecting and Preventing Drive-By Download Attack via Participative Monitoring of the Web," in Information Security (Asia JCIS), 2013 Eighth Asia Joint Conference on Information Security, pp. 48-55. doi: 10.1109/ASIAJCIS.2013.15.

Sedaghat et al., "On-the-fly web content integrity check boosts users' confidence"; Nov. 2002; Communications of the ACM, vol. 45 Issue 11; Publisher: ACM; pp. 33-37.

\* cited by examiner

POLYMORPHIC TREATMENT OF DATA ENTERED AT CLIENTS

TECHNICAL FIELD

This document relates to systems and techniques for interfering with the operation of computer malware, as a mechanism to improving computer system security.

BACKGROUND

Web content may contain application-like functionality that is interpreted and executed within a visitor's browser, or in a similar application. Such functionality may include form fields and other user interface (UI) elements designed to collect input from a user. Although they are intended only for use by legitimate human users, UI elements are susceptible to automatic interference and snooping by computer malware. For example, malicious applications such as "bots" may scan underlying applications for vulnerabilities (and report their findings to a central unlawful organization), may attempt automatically to determine passwords or other credentials for users on whose computers the bots are executing, and/or may intervene between users and legitimate web sites to intercept user information, by interrogating user interface elements, or by collecting user input as it is transmitted within the browser or other application, or at another layer, before the data is encrypted for transmission back to a server system.

Various approaches have been taken to identify and prevent such malicious activity. For example, some approaches install defensive software on client computers. Alternative approaches run various kinds of analysis tools on the transactions and/or network traffic on a server system to detect improper activity.

SUMMARY

This document describes systems and techniques by which web code (e.g., HTML, CSS, and JavaScript) is modified before it is served over the internet by a server system so as to make more difficult the exploitation of the server system by clients (e.g., various computers such as desktops, laptops, tablets, and smartphones) that receive the code (including clients that are infected by malware without their users' knowledge). In certain implementations discussed below, an intermediary system may identify when a client device is to be served code that includes a form that receives input from an end user into fields of the form. When such code for a form or other object that receives user input is identified, the intermediary system may modify or supplement the code, so as to have it include client-side run-time code that helps hide form-filling activity from malware on the client device. Such supplemental code may identify keystrokes on the client device that are directed toward certain fields in the form, and may cause new, hidden fields to be created so that the data typed by the user goes to the hidden fields rather than the original fields, so as to thwart malware that is looking for input into the original fields. In addition, by triggering only on known human user events, such as pressing of keystrokes, the runtime code can assume that the input it is placing in the hidden fields is actual human-entered data rather than automatically-entered data. The form data may then be passed back, and the intermediary system may take the data from the supplemental hidden fields, move the data back into a format that matches the manner in which the code was original served (before the supplementation) and pass the data back to a web server system that originally served the code. The interference of this type with activity by malware can help to prevent an attacked from using a document object model (DOM) application programming interface (API) to fill values in the forms.

Such a system may take further steps to interfere with the operation of malware. For example, the client-side runtime code may encrypt the input data as it is received and as it is passed back to the intermediary system. Also In addition, the inserted code may interfere with the operation of malware by mechanisms other than providing code for receiving user input into hidden fields, or may address elements that are different from the fields that were intended by the web server system to receive such input. For example, various transformations may be applied to different elements that might have been identified as being capable of transformation without affecting the functionality of the served code when it is executed. As just one example, a name of a function may be changed consistently throughout the code that is served so that the function name and calls to the function names are changed similarly throughout the code. Making changes to the code can prevent malware that has been "trained" on the original code from interacting with the served code. Such changes may also be different as between different servings of the code, so that malware cannot readily identify what the change will be for any particular serving of the code. Also, the code may be initially analyzed when it is first-served or at another time, and a mapping may be generated to such function names and other elements in the code that are to be recoded when the code is served. The mapping may be subsequently used each time that the code is served so as to locate elements that are to be changed. With the elements located using the mapping, different changes may be applied to those elements as between particular servings of the code, such as generating random alphanumeric strings to replace function names, and similar changes.

While the changes just discussed are directed toward deflecting malware from interoperating with the code, other additional features may be employed for detecting operation of malware on a device, and may be employed in combination with the features just discussed for deflecting malware. For example, instrumentation code may be added to code that is received by a security intermediary system from a web server system. The instrumentation code may be directed to operating on a client device, such as in a Web browser, and may detect interaction that is made with the other code served from the web server system. For example, the instrumentation code could detect efforts to make function calls to a function name that no longer exists because it has been changed by the intermediary security system. Such detection of attempts to interact with "old" function names may be indicative of malware that is attempting to interact with the code but does not know that the code is changing with each serving (i.e., malware that was trained on an old version of the code, without knowing that the code would be dynamically changing with each serving). Similarly, the instrumentation code may detect evidence of nonhuman use of a computer, such as the entry of text into form fields without the occurrence of keystroke events, and other similar occurrences. In response to detecting activities that may have been instigated by malware, the instrumentation code may report back to a central security system that the particular device appears to be operated by automatic code rather than a human user, and such information may be used by the security server system to identify outbreaks of malware and to develop countermeasures against such malware.

In certain implementations, such systems and techniques may provide one or more advantages. For example, a web security vendor can provide services to customers that decrease the risk that malware can interfere with the customers or the clients to which the customers server data. Such provision of services may occur, in certain implementations, modularly, without a need for a customer's web server system even to know that security services have been provided. In addition, the provision of greater security for user input may be accompanied by other security measures, including others that involve supplementing or recoding the code that is provided by a web server system. For example, certain elements that do not receive user input can be recoded in a constantly changing manner for each serving of the code, so as to block attempts to interface with such elements. As a result, organizations that serve web code or similar code may lower security risks for themselves and the people with which they interqact.

In one implementation, A computer-implemented method s disclosed that comprises identifying, in web code to be served to a client, presence of code for generating a form; generating additional, executable code to be run on the client device, the additional, executable code being arranged to identify user input on the client device and modify the form so that data from the user input is received into one or more alternative fields of the form other than a first field to which a user performing the input directed the input; receiving a request from the client device based on completion of input into the form; and converting data from the received request so that data for the one or more alternative fields of the form is directed to the first field of the form for processing by a web server system that initially generated the web code. The additional, executable code can be generated by an intermediary security server system located between the web server system and the Internet, and that intercepts data served from and requests provided to the web server system. Also, identifying the presence of code for generating a form can comprise parsing HTML code generated by the web server system. Moreover, identifying the presence of code for generating a form can include at least partially rendering a web page represented by the web code, and analyzing a DOM generated by the at least partially rendering of the web page.

In certain aspects, the one or more alternative fields are hidden fields that are not visible to a user of the client device. In addition, the additional, executable code can further be arranged to encrypt characters entered into the form by the user before transmitting the request. Moreover, the additional, executable code can be further arranged to insert dummy characters in the first field. Converting the data from the received request can also comprise identifying data for performing a reverse transformation on data in the received request, wherein the reverse transformation corresponds to a transformation that was dictated by the additional, executable code. The method can also include serving code for generating the form and additional, executable code to a second client device, wherein the additional executable code is arranged to modify the form in a different manner than was the additional, executable code provided to the client device.

In another implementation, a computer-implemented system is disclosed that comprises one or more computer processors; and one or more tangible storage devices accessible by the one or more processors and storing instructions that, when executed, perform operations that include: identifying, in web code to be served to a client, presence of code for generating a form; generating additional, executable code to be run on the client device, the additional, executable code being arranged to identify user input on the client device and modify the form so that data from the user input is received into one or more alternative fields of the form other than a first field to which a user provider the user input directed the user input; receiving a request from the client device based on completion of input into the form; and converting data from the received request so that data for the one or more alternative fields of the form is directed to the first field of the form for processing by a web server system that initially generated the web code.

Moreover, another implementation includes a computer-implemented system that comprises a plurality of client devices; a web server system; and a security server system having one or more tangible, non-transient storage devices and arranged to respond to requests from the plurality of client devices by obtaining code from the web server system and modifying the code from the web server system so as to add additional, executable code to cause data input at the plurality of client devices that is entered into fields of the form that the code identifies, to be stored instead in fields that are created by supplemental code generated by the security server system. In such a system, the security server system can be further arranged to convert data from requests received from particular ones of the plurality of client devices so that data stored in the fields that are created by the supplemental code is directed to fields from an original version of the form served by the web server system. Also, the fields created by the supplemental code may comprise hidden fields that are not visible to a user of the client device. Moreover, the supplemental code can be arranged to insert dummy characters in the fields that the data is entered into by users.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Described below are systems and techniques for deflecting and detecting malware activity on client devices to which a server system serves computer code. One deflection technique involves serving code, such as HTML and other code for generating a web form, with additional executable code that identifies keystrokes and other data indicating human user interaction such as clicks (e.g., with a mouse) and other gestures (e.g., with a touchscreen) on a client device that are directed to the web form (or other appropriate UI element). The executable code may then place the input characters into hidden fields on the form and may also encrypt or otherwise encode the characters so as to prevent ready ascertainment of the characters by malicious software (malware). When the form data is returned to the security system that added the executable code, the data associated with the hidden fields may be mapped back to the original fields before it is passed to the web server that created the original code, so that the web server does not need to know about the operation of the security intermediary that provided the extra executable code.

Figure 1:
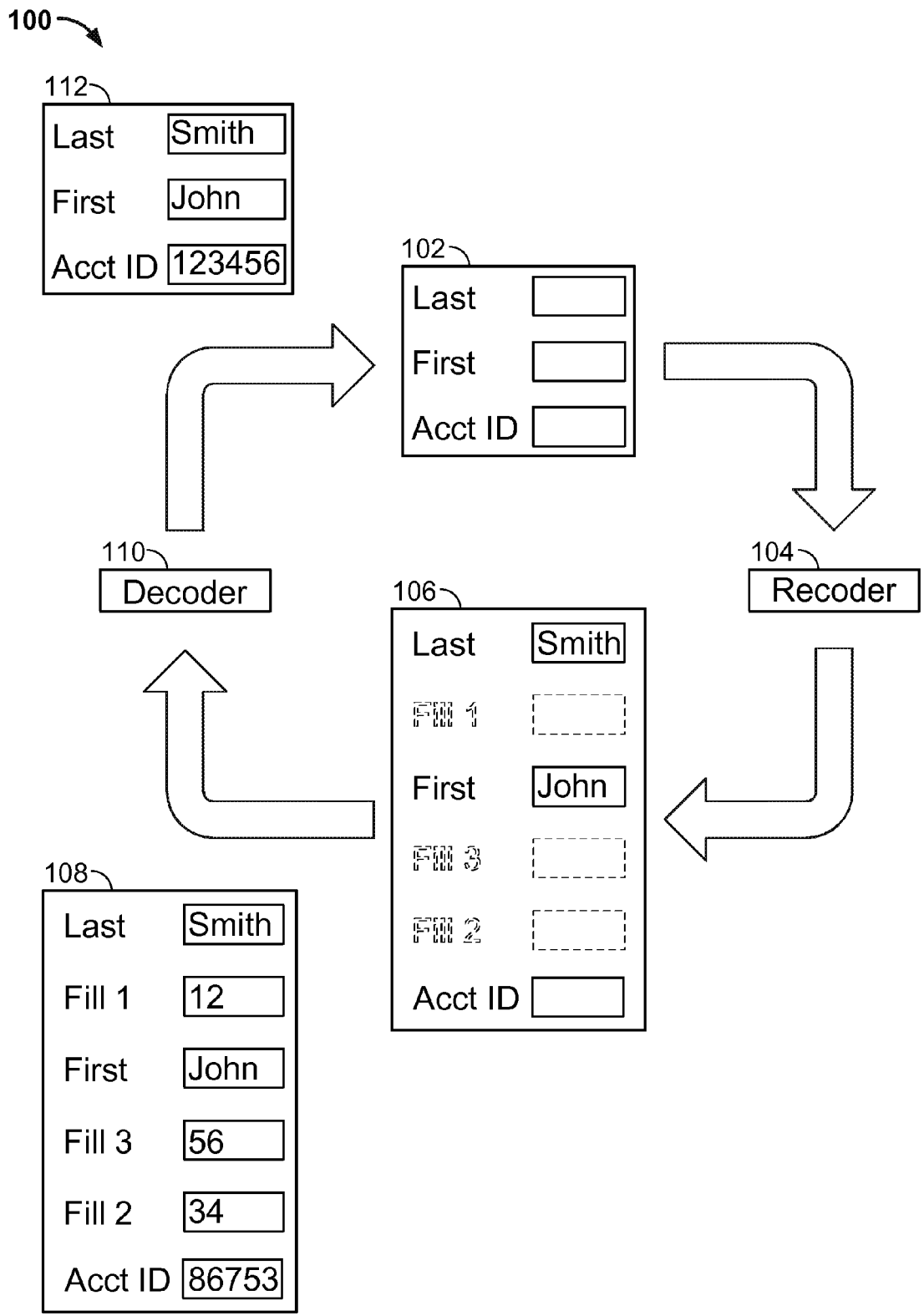
FIG. 1 is a conceptual diagram of a system for altering data input by a user for security purposes.

FIG. 1 is a conceptual diagram of a system 100 for altering data input by a user for security purposes. In general, the system 100 provides for alteration, supplementation, or both for code that is to be served from a web server system or similar server system to a plurality of client computing devices, such as desktop computers, tablets, smartphones, laptops, and other computers. Such added code may be directed to altering the manner in which input from a human user of a client computing device is handled (e.g., typed input provided by a keyboard, clicks from a mouse or similar device, or other gestures such as those supplied to a touchscreen), whether virtual or physical, or by a speech-to-text facility associated with the device. In certain instances, the manner in which the input data is altered may vary for each serving of code to a particular client device or to different client devices (e.g., by changing the code that is served to each device or changing parameters to which the code refers, for each such serving of the code), so that malware that is monitoring the operation of the system will have an increasingly difficult time determining what the system will do for any given serving of the code.

The system 100 is shown representationally in terms of a cycle of code that is served to a client device, and a request that is returned from the client device and processed. The initial serving of the code may occur by way of a web server system, and the code may be recoded and re-served by a security intermediary system that is located between the web server system and the Internet. The security intermediary system may be tasked with performing a number of operations on the code that is initially served by the web server system so as to reduce the vulnerability of the code to attack by malware. In other embodiments, the intermediary server system may be part of the web server system, and code added by such a system may be initially incorporated with code from the web server system, rather than being added after the initial code is served from the web server system.

The process shown here begins by the generation of code for generating a form 102, where in this example, the form receives input for a user's last name, first name, and account identification number. Such a form may be served, for example, by a bank that is seeking information to authenticate a banking customer in preparation for providing account access to that customer. Plainly then, the information provided into such a form may be private and sensitive data that the bank would not want shared with outsiders, and particularly with malware operators. As shown by a first arrow, the code for the form 102 is provided to a recoder 104 that may be part of the security intermediary system. The recoder 104 may be provided the code for the form 102 along with other code served by the banking system, such as code that shows a logo for the bank and instructions for a user interacting with a webpage for the bank. The recoder 104 may analyze such code for a number of purposes, including, relevant to the present document, for the presence of web forms and other UI elements that are designed to receive typed import or other input from a user of a client computing device. Such analysis may include searching for particular HTML elements and other elements that are known to correspond to web form generation. The recoder 104 may also be programmed to recognize which web form fields or other elements are considered sensitive, and may perform the operations discussed here only on such elements. Such identification of sensitive fields or other elements may occur by the recoder 104 being provided with a white list of element names, such as by the recoder 104 searching for fields labeled with terms such as account, identity, identifier, social security, password, and other common identifiers for fields that receive sensitive data.

Upon identifying such fields, the recoder 104 may generate executable code in the form of a runtime that may be served along with the code from the web server system to execute at a particular time on the client device, such as when the form 102 is generated and displayed on the client device. The executable code may be directed to affecting the manner in which data is entered into the form 102 or in other location, when a user interacts with the form 102 or believes that he or she is interacting with the form 102.

Modified form 106 represents such interaction by a security server system with code for a form that includes content from the initially served form 102 and additional content provided by the added executable code from the recoder 104. In particular, the fields "last," "first," and "account ID" are still located and displayed on the form. In addition, three hidden fields have been added to the form, called "Fill1," "Fill2," and "Fill3." In this example, the three hidden fields may correspond individually to each of the three original fields, or all three hidden fields may correspond to a single original field. Different combinations of added fields to original fields may also be implemented (e.g., with 1-to-1, n-to-1 or 1-to-n correspondence). The hidden fields are so-called because they received input from a user interacting with the form but are not visible to a user when displayed on a browser.

An protected form for a different example may be represented by code as follows:

```
<form id='login' action='/web/login.php' method='POST'>
Email: <input type='text' id='login_email' name='email' size='15'
autocomplete="off"> <br>
Password: <input type='password' id='login_password'
Name='password' size=15 autocomplete="off" '> <br>
<input type='submit' value='login' id='login_button'>
</form>
```

When a user types a key, a hidden field may be dynamically created, and the client-side runtime may store a encoded/encrypted value of what was typed in the hidden field.

Multiple hidden fields in the figure (e.g., fields Fill1, Fill2, and Fill3) may receive input together when the input is directed toward a single visible field in various manners. For example, the supplemental executable code that was added to the code for displaying the form 102 may intercept keystrokes directed to the "account ID" field, and may place data for the first two keystrokes in one hidden field (Fill1), data for the next two keystrokes in the next hidden field (Fill2), and data for the final two keystrokes of a six digit ID number in the third hidden field (Fill3). Such placement of the data is shown in the form 108. Though shown as a form graphically in the figure for clarity, the data may take a variety of formats and may normally be transmitted as a standard HTTP request from a browser back to the security server system that served the original and supplemented executable code. As can be seen in the form 108, the user entered an account ID of 123456. The first two digits are carried by Fill1 field, the second two are carried by Fill2 field, and the last two digits are carried by the Fill3 field. The executable code has also inserted a dummy ID number into the account ID field so as to further interfere with malware that may be snooping on the code. Note that the "Fill" fields are positioned out of order in the request that is sent by the client device, which also further interferes with attempts by malware to determine what the user ID number was. Though not shown here, the data in fields Fill1, Fill2, and Fill3, may further be encrypted so as to more greatly interfere with malware efforts.

In the separate example shown above interaction with a form generated by the HTML code above may cause a hidden field "_ss_hid_email_" to be created when a user starts to type input into a field in the form, as follows:

```
<form id='login' action='/web/login.php' method='POST'>
Email: <input type='text' id='login_email' name='email' size='15' autocomplete="off"> <br>
<input type="hidden" id="_ss_hid_email_" name="_ss_hid_email_" value="ttoomm">
Password: <input type='password' id='login_password' Name='password' size=15 autocomplete="off" '> <br>
<input type='submit' value='login' id='login_button'>
</form>
```

In this example, the encoding simply duplicates each character that a user types for the field, where the encoded value is "ttoomm" after the user has entered "tom."

The request is then passed from the client device to a decoder 110, which may be a corresponding subpart of the same system that contained recoder 104 (e.g., the security server system). The decoder 110 is directed to reversing changes to data that may have been caused by the introduction of the supplemental code introduced by the recoder 104. For example, in this illustration of the figure, the decoder 110 may access information that indicates the form of transformation applied by the executable code to form 102 and may undo that transformation. For example, the decoder 110 may extract the six digits from the hidden fields and may reassemble those digits and place them in the original account ID field. The decoder 110 may then pass that the data on to the web server system in a manner that such data appears to simply be a request directly from the client device and may be made irrespective of the present of security transformations that have occurred on the data. Such a request is shown by form 112 that again, is shown formatted as an actual form, though the data may typically be provided as an HTTP request or similar data transmission. As is shown, the form is passed back to the web server system as if the user had entered his or her last name, first name, and account ID number directly into the form 102 that had been originally served by the Web server system A request for the "tom" example above may take the form of:

```
POST /web/logIn00.asp HTTP /1.1
Host: test.com
Content-Type: application/x-ww-form-unencoded
Content-Length:30
email=tom&password=pss&_ss_hid_email_=ttoomm&_ss_hid_password_=ppaasss
```

When the security intermediary receives the request containing data for the modified version of the form, it discards the value from the original parameter and decodes the encoded data into the original parameters, and then submits the restored request on behalf of the user in the format that the web server expects based on the original code that the web server served. The restored request may take the form of:

```
POST /web/logIn00.asp HTTP /1.1
Host: test.com
Content-Type: application/x-ww-form-unencoded
Content-Length:30
email=tom&password=pass
```

In certain implementations, the robustness of a security process like that just discussed may be improved by changing the manner in which the form 102 is recoded by the security server system each time that it is served to the same user or different users. For example, the "account ID" field may be split up, moved around, renamed, supplemented, and otherwise affected in many different ways to achieve the same result of returning obscured input by a user back to the server systems from the client device. A separate transformation may be identified for every serving of the code, a style of transformation may be identified and different values may be used to alter the way the style is served every time, or a finite number of alterations may be identified in advance, and each serving of the code may switch between and among such alternative identified transformations. Where a common style of transformation is used and changed slightly with each serving, for example, the parameters that are changed each time can include the field names for hidden fields, the positioning of the hidden fields, the number of hidden fields, the size of the hidden fields, the data types for the hidden fields, a key for encrypting information entered into the hidden fields, and other similar parameters that may provide for sufficient variability in the code that is served each time so as to interfere with the ability of malware to determine how the code is operating.

Also, code that is served for a particular page may be analyzed once and multiple different transformations may subsequently be performed using the analysis when serving the code to different users. For example, forms and fields in the forms may be identified by an initial analysis, and a mapping may be generated to identify where, in the served code, the form and fields are located. Such a mapping may be used in subsequent serving of the page to quickly find the forms and the fields, and to perform the transformations on such forms and fields. In such a manner of analyzing once and transforming multiple times in different manners, a system may operate more efficiently and require substantially less computing power, as the analysis steps may involve much more work than the transformation step.

Other alterations may be made to the code, as described in more detail below, in addition to the provision of features for causing polymorphic user input to occur. For example, various function names and other elements may be randomly renamed though such renaming may occur consistently across the HTML, CSS, and JavaScript code so that the code does not break. The particular names may change from one serving of the code to the next, and data that is passed back that includes the changed names may be reverse trans-coded by a security intermediary before being provided back to the web server system than initially served the code, all in manners similar to that just discussed for the handling of data that is entered into a form on a webpage. Yet additional transformations to the served code may be made to provide additional countermeasures as further described with respect to the following figure.

Figure 2:
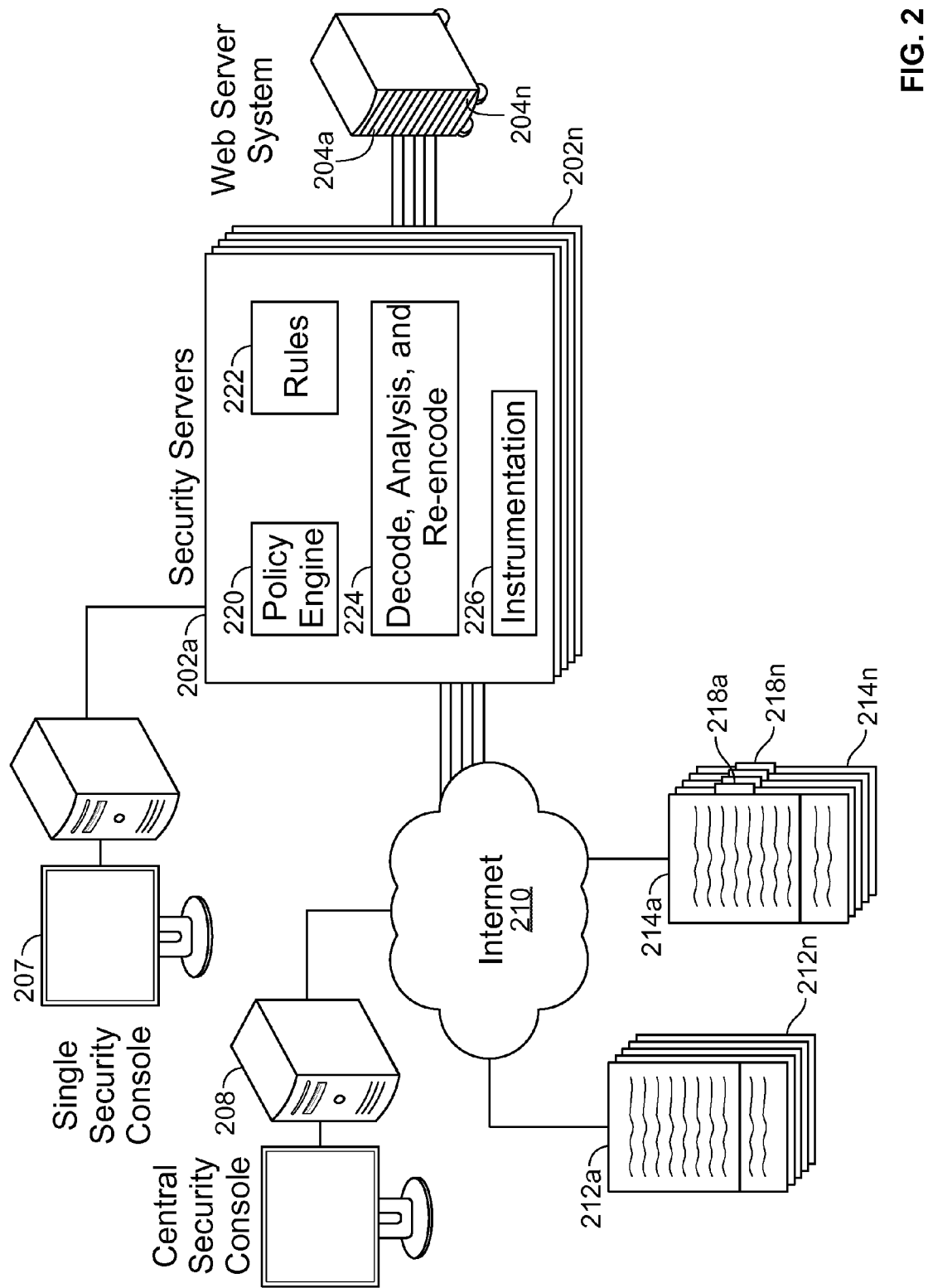
FIG. 2 shows a system for serving polymorphic and instrumented code.

FIG. 2 shows a system 200 for serving polymorphic and instrumented code. Generally, polymorphic code is code that is changed in different manners for different servings of the code in manners that do not affect the manner in which the executed code is perceived by users, so as to create a moving target for malware that tries to determine how the code operates, but without changing the user experience. Instrumented code is code that is served, e.g., to a browser, with the main functional code and monitors how the functional code operates on a client device, and how other code may interact with the functional code and other activities on the client device.

The system 200 may be adapted to perform deflection and detection of malicious activity with respect to a web server system. Deflection may occur, for example, by the serving of polymorphic code, which interferes with the ability of malware to interact effectively with the code that is served. Detection may occur, for example, by adding instrumentation code (including injected code for a security service provider) that monitors activity of client devices that are served web code.

The system 200 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 204a-204n, and could include a broad array of web servers, content servers, database servers, financial servers, load balancers, and other necessary components (either as physical or virtual servers).

In this example, security server systems 202a to 202n (which may implement components like the decoder 110 described with respect to FIG. 1) may cause code from the web server system to be supplemented and altered. In one example of the supplementation, code may be provided, either by the web server system itself as part of the originally-served code, or by another mechanism after the code is initially served, such as by the security server systems 202a to 202n, where the supplementing code causes client devices to which the code is served to transmit data that characterizes the client devices and the use of the client devices in manners like those discussed in the many examples above. As also described below, other actions may be taken by the supplementing code, such as the code reporting actual malware activity or other anomalous activity at the client devices that can then be analyzed to determine whether the activity is malware activity.

The set of security server systems 202a to 202n is shown connected between the web servers 204a to 204n and a network 210 such as the internet. Although both extend to n in number, the actual number of sub-systems could vary. For example, certain of the customers could install two separate security server systems to serve all of their web server systems (which could be one or more), such as for redundancy purposes. The particular security server systems 202a-202n may be matched to particular ones of the web server systems 204a-204n, or they may be at separate sites, and all of the web servers for various different customers may be provided with services by a single common set of security servers 202a-202n (e.g., when all of the server systems are at a single co-location facility so that bandwidth issues are minimized).

Each of the security server systems 202a-202n may be arranged and programmed to carry out operations like those discussed above and below and other operations. For example, a policy engine 220 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their inter-operation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 202a-202n, such as by the security servers 202a-202n implementing a web crawler (not shown) to recursively search for new and changed content and to report such occurrences to the security servers 202a-202n, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 222 may store analytical rules for performing such analysis and for re-encoding of the content. The rules engine 222 may be populated with rules developed through operator observation of particular content types, such as by operators of a system studying typical web pages that call JavaScript content and recognizing that a particular method is frequently used in a particular manner. Such observation may result in the rules engine 222 being programmed to identify the method and calls to the method so that they can all be grouped and re-encoded in a consistent and coordinated manner.

The decode, analysis, and re-encode module 224 encodes content being passed to client computers from a web server according to relevant policies and rules. The module 224 also reverse encodes requests from the client computers to the relevant web server or servers. For example, a web page may be served with a particular parameter, and may refer to JavaScript that references that same parameter. The decode, analysis, and re-encode module 224 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 202 along with an identifier for the particular client computer so that the system 202 may know which key or function to apply, and may otherwise maintain a state for the client computer and its session. A stateless approach may also be employed, whereby the system 202 encrypts the state and stores it in a cookie that is saved at the relevant client computer, or in a hidden field such as a field on a form that is being presented to a user and for which the input to the form is being obfuscated in a polymorphic manner. The client computer may then pass that cookie data back when it passes the information that needs to be decoded back to its original status. With the cookie data, the system 202 may use a private key to decrypt the state information and use that state information in real-time to decode the information from the client computer. Such a stateless implementation may create benefits such as less management overhead for the server system 202 (e.g., for tracking state, for storing state, and for performing clean-up of stored state information as sessions time out or otherwise end) and as a result, higher overall throughput.

The decode, analysis, and re-encode module 204 and the security server system 202 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The decode, analysis, and re-encode module 224 may be adapted to apply different modifications to each instance of a common web resource, or common portion of a web resource, such that the web code that it is ultimately delivered to the client computers in response to each request for the common web resource includes different modifications.

In certain implementations, the analysis can happen a single time for a plurality of servings of the code in different recoded instances. For example, the analysis may identify a particular function name and all of the locations it occurs throughout the relevant code, and may create a map to each such occurrence in the code. Subsequently, when the web content is called to be served, the map can be consulted and random strings may be inserted in a coordinated matter across the code, though the generation of a new name each time for the function name and the replacement of that name into the code, will require much less computing cost than would full re-analysis of the content. Also, when a page is to be served, it can be analyzed to determine which portions, if any, have changed since the last analysis, and subsequent analysis may be performed only on the portions of the code that have changed.

Even where different modifications are applied in responding to multiple requests for a common web resource, the security server system 202 can apply the modifications in a manner that does not substantially affect a way that the user interacts with the resource, regardless of the different transformations applied. For example, when two different client computers request a common web page, the security server system 202 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

An instrumentation module 226 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 202 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 202, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 204a-704n, as encoded by decode, analysis, and re-encode module 224, may be rendered on web browsers of various client computers. Uninfected client computers 212a-212n represent computers that do not have malicious code programmed to interfere with a particular site a user visits or to otherwise perform malicious activity. Infected client computers 214a-214n represent computers that do have malware or malicious code (218a-218n, respectively) programmed to interfere with a particular site a user visits or to otherwise perform malicious activity. In certain implementations, the client computers 212a-212n, 214a-214n may also store the encrypted cookies discussed above and pass such cookies back through the network 210. The client computers 212a-212n, 214a-214n will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 212a-212n, 214a-214n. For small-scale analysis, each web site operator may be provided with a single security console 207 that provides analytical tools for a single site or group of sites. For example, the console 207 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

Console 207 may also be multiple different consoles used by different employees of an operator of the system 200, and may be used for pre-analysis of web content before it is served, as part of determining how best to apply polymorphic transformations to the web code. For example, in combined manual and automatic analysis like that described above, an operator at console 207 may form or apply rules 222 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 208 may connect to a large number of web content providers, and may be run, for example, by an organization that provides the software for operating the security server systems 202a-202n. Such console 208 may access complex analytical and data analysis tools, such as tools that identify clustering of abnormal activities across thousands of client computers and sessions, so that an operator of the console 208 can focus on those clusters in order to diagnose them as malicious or benign, and then take steps to thwart any malicious activity.

In certain other implementations, the console 208 may have access to software for analyzing telemetry data received from a very large number of client computers that execute instrumentation code provided by the system 200. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 208 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 200, may be blocked from interaction, or may have their operators notified that their computer is potentially running malicious software (e.g., by sending an e-mail to an account holder of a computer so that the malicious software cannot intercept it easily).

Figure 3:
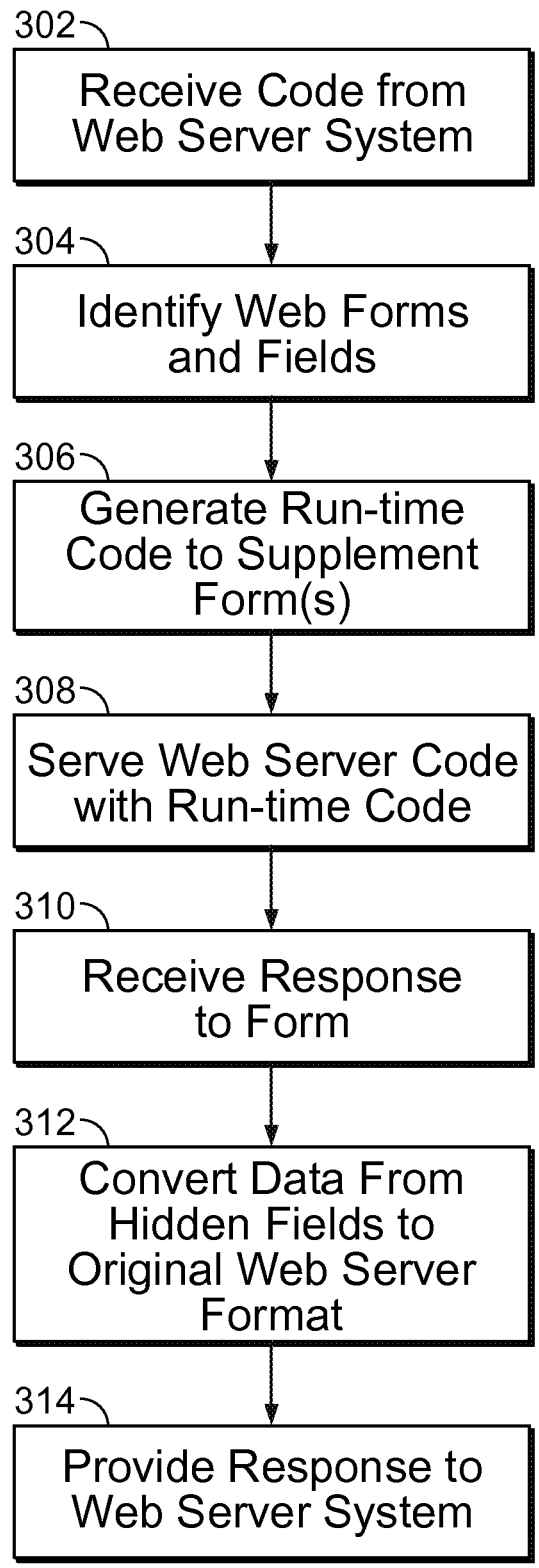
FIG. 3 is a flowchart of a process for serving code that generates obscured user input for security purposes.

FIG. 3 is a flowchart of a process for serving code that generates obscured user input for security purposes. In general, the process involves supplementing and altering code that was to be served to a client device so as to cause a change in the manner in which user input is received by elements that are served with the code. In particular, keystrokes entered by a user or other input may be intercepted and encoded in a manner that is different than it would have been encoded by the originally served code. The elements for the originally served code may also be left in place so that malware attempting to interfere with the operation of the code will believe that the code is still in its original form, and may not look for the supplemental activity that has been added to the code.

The process begins at box 302, where web code is received from a web server system. Such code may be received by a security intermediary such as security servers 202a-n in FIG. 2. The code may also be received by a component of the same servers that generated the code. The code may take a variety of forms and may include a combination of HTML, CSS, and JavaScript code that interact with each other such as by making calls from one type of code to another type of code, and across different files of the code (e.g., from one file of JavaScript to another file). The code may be normal code that is served by a commercial organization through the web to individuals requesting information from web browsers. The code may include a variety of elements, including elements for generating a form or other object for receiving user input at a client device, including typed user input and equivalents to typed user input such as spoken input that is directed to fields in the form or relevant portions of other similar objects.

At box 304, the process identifies web forms, and fields for those forms, in the code that is to be served. Such identification may include scanning the code or parsing the code and searching for particular tags or other elements that indicate the presence of a web form. The process may also be programmed to parse within a web form once it is found so as to identify the type of data that is expected to be entered into the web form, and other information such as field names and the positioning of data entry fields on the form.

At box 306, the process generates runtime code to supplement the form or forms that have been found in the original code. Such a process may also involve altering or supplementing the original web page code itself so as to permit better operation of the run-time executable code. The runtime code may, for example, monitor the operation of the original code on a browser of a client device and identify when a user is interacting with a form, such as by monitoring a document object model (DOM) for the code that is served. The runtime code may then inject itself in the interaction with the user so as to identify keystrokes made by the user, capture the data represented by those keystrokes, and place that data in a location other than the fields in the form to which the input data was directed. As one example, the runtime code may cause additional fields to be created for the form by manipulating the document object model, and may place the entered data into those additional hidden fields rather than in the fields into which the data was expected to be placed. At the same time, the runtime code may cause dummy data to be entered into the original fields, and may use the field names or other appropriate information to determine what sort of dummy information to use. For example, if a field is named "social security number" or "SSN," the dummy data may include numeric digits formatted to match a typical social security number (3 digits, 2 digits, and 4 digits), so that malware that might interrogate the original field will believe that the user actually entered a social security number into the field.

The runtime code may also be programmed to further obscure the data that it entered in addition to placing the data in an unexpected location such as a hidden field. For example, the runtime code may split the data and reorder it into multiple fields or within a particular field. The runtime code may also encode or encrypt the data so that it is not in plaintext form and requires additional effort to identify it. In other implementations, the runtime code may additionally create other false activity on the client device so as to interfere with the ability of malware to identify what is occurring on the client device.

At box 308 the web server code is served to one or more client devices along with the executable runtime code. Such serving may occur in a static manner, where the runtime code is the same each time the web code is served. The serving may also be in a dynamic manner, such that the runtime code or parameters associated with the runtime code are changed each time the code is served. For example, the particular code may change so that the manner in which the user input is obfuscated from malware inspection changes with each serving. As one example, different hidden fields may be created by the runtime code for different servings of a web page that is supplemented with the runtime code. As an alternative, or in addition, the runtime code may be written with flexibility so that it addresses particular parameters that change the way that it operates, and those parameters may be changed for each serving of the code, but the code may otherwise stay the same. For example, the parameters may define the number of hidden fields that will be generated by the runtime code, a data input field in the original form to which the runtime form is to be applied, a manner in which input data is to be encoded such as by providing an encryption key for access by the runtime code, and other similar parameters. In such an implementation, the code could be relatively static, and the polymorphist action of the user input handling may be represented simply by changing variables that the code accesses when it is run.

In serving the original web code and the runtime code, the process may take steps to track the served code so that, when requests are received back from a particular client device, those requests may be properly handled by the process. For example, a session code may be saved in a security intermediary set and may be used to identify appropriate information for performing reverse transformations on requests received from particular client. In another example, such an identifier or key needed to perform accurate reverse transformations may be served to each particular client device and returned with any request from the client device, so that the security server system does not need to manage the overhead of maintaining and tracking such keys.

At box 310, the security intermediary receives a response that was made with respect to the form. For example, a user at a particular client device may have entered identifying information to verify himself with a banking system, such as a birth date and social security number. Such information may have been obtained by the runtime code and re-encoded into an HTTP request that is sent back to the security intermediary.

At box 312, the process converts data from hidden fields to the original web server format. For example, when data entered by a user is received back, it may be in portions of an HTPP requests that do not correspond to what would have been sent if the code for the web page had not been altered and supplemented. The process in this step converts the request into a format as if there had been no alteration or supplementation of the code, so that the request is in a format that can be handled naturally by the web server system that originally served the code. Such transformation allows the security intermediary to operate without alteration of the web server system itself, and can permit an organization that wants to add such security services to do so without major interruption in its other infrastructure area At box 314, the response is provided to the web server system in the transformed state, so that the response has basic information in a form entered by the user, rather than the obfuscated information that was created by the runtime code on the client device.

In this manner then, the process may conveniently create interference with malware that is attempting to hijack information typed by the user of the client device, and in particular implementations, may do so without any real need to alter existing web server systems that an organization may have operating and well-tuned already.

Figure 4:
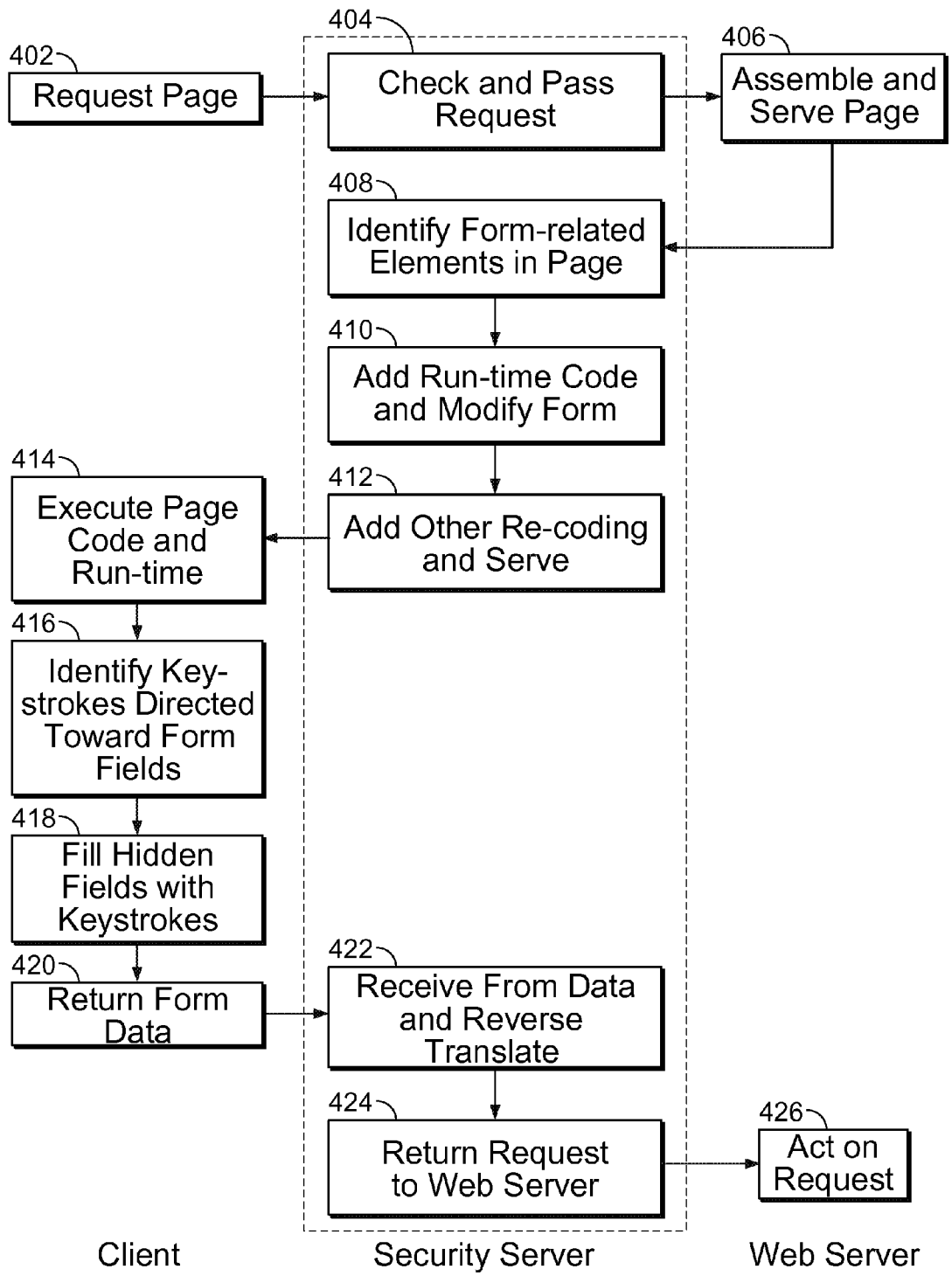
FIG. 4 is a swim lane diagram of a process for serving code that obscures user input.

FIG. 4 is a swim lane diagram of a process for serving code that obscures user input. In general, the process is similar to that shown in FIG. 3, though particular steps are shown as examples to better illustrate actions performed by particular components in a system for providing obfuscation of user input at client devices.

The process begins at box 402, where a client device requests a webpage from a Web server system. At box 404, the request is intercepted by a security server system that is operated by the same organization that operates the web server system, or by a vendor acting on the behalf of such organization. The security server system checks the request and passes it on to the web server. Such a check may simply be to determine that the request is in a basic form and does not include data that may need transformation, as will be seen in later requests in this example. For example, an initial request for a homepage may be bare and not need any services from the security server system before it is passed on to the web server system.

At box 406, the web server system assembles and serves the requested webpage. Such action may involve identifying various types of computer code, such as HTML, CSS, and JavaScript code. The basic serving of web code for various types of requested webpages is well known and may occur here through any appropriate method.

At box 408, the security server system identifies form-related elements in the page that is been served by the web server system. As discussed above, such identification of elements in the served code may include parsing the code to identify particular elements in the code that are knowing to be related to forms and other mechanisms that are used to receive user input for a browser, or similar client-side application. Once a form is found, the process may identify parameters of the form, including the fields in the form that are to receive user input, the layout of the form when it is displayed to a user, and other parameters. Such fields may be further analyzed, such as to identify fields that are likely to receive sensitive information, such as fields that are labeled with some form of the terms "password," "identification," "social security," and other similar field names that are commonly used to receive sensitive data. In certain implementations, the organization that operates the web server system can identify particular fields that it considers to be sensitive, and a list of such fields may be accessed by the security server system in its attempt to identify fields on particular webpages that are likely to be sensitive in nature.

At box 410, runtime code is added to the code that will be served to the client device, and necessary modifications to the form or other appropriate object for receiving user input may be made. For example, the runtime code may be generated as JavaScript or similar code that will be executed on the client device after being called by a line added to the HTML code that is served, where the JavaScript code may monitor for keyboard-related events directed to the form and may alter the DOM in accordance with such events. For example, when the runtime code recognizes or determines that a user has directed input to a field in a form that was previously determined to be sensitive in nature, the runtime code may place substitute input in that field and may place the user's input into a hidden field that it has created for the form. Such substitution may occur in a manner that does not affect the user's perception of the webpage, so that the user sees his or her input entering the appropriate field of the form. In certain implementations, the security server system may alter the font definitions for the user's Web browser so that the substitute characters will be displayed to look like the characters actually typed by the user, where such activity may be implemented by redefining a font map so that the glyphs represented by particular characters in the font map correspond visually to other characters in an alpha numeric.

At box 412, the security system adds other re-coding to be code from the web server system and serves all such code to the client device that requested the webpage initially. Other re-coding may take a variety of forms, and may include rewriting portions of the code where such a rewriting will not affect the manner in which the webpage is interacted with by the user. For example, names of functions and other items in the code may be changed in essentially random manners so as to interfere with malware that is attempting to access the code using the traditional names for those items. Such changing of the names may be consistent across a particular serving of the code so that the code does not break when it is served, but may vary with each serving of the code. For example, a particular function name may be assigned a random alphanumeric name that differs from its traditional name for each serving, and the random name may be different for each such serving of the code. The identification of elements in the code that are susceptible to polymorphic re-coding in this manner may be identified once through an analysis of the code, and may be changed subsequently many times using that analysis and applying new and different names each time, where the new names may be inserted by referring to a map that was generated during the initial analysis. In that way, such re-coding may be performed relatively efficiently by minimizing the number of times that the code needs to be analyzed. Of course, when the code is identified as having been changed by a developer of the system, partial or complete re-analysis of the code may be necessary to ensure that no function names or other items have been moved, removed, added, or otherwise affected in a way that would break the code if the prior analysis were used. In such a situation, the map may be updated to reflect the newest changes to the code.

At box 414, the client device receives the webpage code as it has been recoded and also receives the executable runtime code with the webpage code. The client device may, for example, begin to load the webpage through a browser and render the webpage while executing the HTML code that represents the webpage. Such HTML code may call one or more pieces of JavaScript code, such as the executable runtime code. The executable runtime code may then become active on the client device and may begin monitoring events on the device such as the occurrence of keystrokes on the device, clicks on an input device, or other gestures on input devices such as on touchscreens or spoken input to a speech-to-text mechanism, and may particularly attempt to identify keystrokes directed toward fields in a web form that was previously identified as containing potentially sensitive data. Such identification of keystrokes or other human user input interactions with the form is indicated by box 416.

At box 418, when user input to sensitive elements has been identified, the runtime code on the client device may cause the user input to be obfuscated from the perspective of malware that may be executing on the client device. Such obfuscation may include filling hidden fields in a form with user input that was directed toward visible fields in the form. For example, the runtime code may interact with the DOM for the webpage that is being displayed so as to add hidden fields to a form and fill those fields with the data entered by the user, while leaving the original fields blank or otherwise affecting the original fields so as to interfere with the operation of malware on the client device (e.g., placing a fake SSN in the real field). The runtime code may also encrypt or otherwise encode the data that it supplies to the hidden fields so as to interfere with the operation of malware that is able to identify the presence of the hidden fields.

At box 420, the client device returns the form data. For example, when a user selects a "submit" button on the webpage after entering his or her data, the webpage page code may be caused to generate an HTTP request back to the web server system. The runtime code may intercept such request and cause the request to be populated with data from the hidden fields that the runtime code previously created, where those fields hold the information that was entered by the user, though perhaps in encrypted or otherwise encoded form. The runtime code may also construct an HTTP request that includes the user-entered data, but in a manner that obfuscates the user-entered data, so that interception of the request by malware will not enable the malware to immediately identify the data. In some examples, the HTTP request may be populated with multiple different fields having varying names, and the user data may be spread across those fields in an order that is different than the order in which it was entered by a user.

At box 422, the security server system receives the form data and performs a reverse translation on the received data. Such reverse translation may be aimed at putting the user-entered data back into a format that matches what would have been sent by the client device if the security server system had not intercepted and changed the code that was served by the web server system. For example, the security server system may generate an HTTP request that includes the user-entered data in fields that correspond to fields that were originally generated with the form by the web server. In particular embodiments, the HTTP request matches precisely a request that would be expected if a user interacted with the actual code that was served by the web server system. In such a situation, then, the web server system will not need to be adjusted so as to take into account the operation of the security server system (its operation may be transparent or essentially transparent to the web server system), which may be beneficial for the simple operation of the web server system for an organization that seeks to add security capabilities to its implementation.

In certain other implementations, the web server system may need to address certain operations being performed by the security server system, and adjust the code that it serves in response, though not all operations performed by the security server system. In such an implementation, then, the security server system may add certain features on a test basis without having to force a change by the operator of the web server system. However, certain prominent or important features may require interaction that is more tightly coupled to the web server system, and such features may be implemented after consulting with the operator of the web server system and having such operator change the security-based computer code.

In one example where the web server system would change the code it serves to better interoperate with the security server system, a web server system may place a header or other section of code in the code that it serves, in order to identify for the security server system particular attributes of the webpage that is being served. For example, developers employed by the operator of the web server system may identify fields that they believed to be sensitive, and may add tags or other sorts of flags to such items, and the analysis module for the security server system may be programmed to identify such manually-added tags and use them to better navigate the code for analysis and transformation. In other situations, developers or a development environment for the web server system may add other contextual data to help guide the analysis system of the security server system.

The reverse translation at box 422 may be arranged to correspond inversely to whatever transformations were made in boxes 408-412. For example, if the runtime code was written to add multiple fields to a form as proxies for one initial field, the reverse transformation may merge data from those multiple fields into a single field that corresponds by name to the initial field from the web server system. Similarly, if names of functions or data was encoded or encrypted using the function in a first direction, those names may be decoded by the security server system by applying a function that operates in the opposite direction.

At box 424, the security server system returns the request to the Web server system. As noted above, such request may take the form of an HTPP request that matches a form that would be expected by the web server system if no alterations had been made to the code that the web server system originally served. At box 426, the web server system acts on the request. For example, the web server system may take customer identification information received from interaction with a form and cause a transaction to be performed for the particular customer. Various other appropriate operations made also be performed using data that was entered by the user in a web form or other appropriate object served by the web server system. A wide variety of user interaction mechanisms are known for webpages, and the techniques here may be used to help obscure the user interaction with such items from malware that is attempting to interfere with the operation of a web server system.

In this manner, the process discussed here, in particular implementations, may provide a mechanism by which to add security to a webpage for an organization that serves the webpage without substantially interfering with the existing operation of that organization, and without a need for expensive integration work by people who are currently operating the web server system. As discussed, the system may be implemented as an intermediary server that monitors requests into the web server system, and code downward served by the web server system, and makes appropriate alterations or additions to such requests and code so as to add security to the code. The system may make the changes in a different manner each time the code is served so as to improve the security by making the code a moving target for any malware that is attempting to interact with the code. Also the intermediary system may perform transformations in both directions so that the web server system may both serve and receive code in a manner that it expects and without needing to tightly integrate with the security server system.

Figure 5:
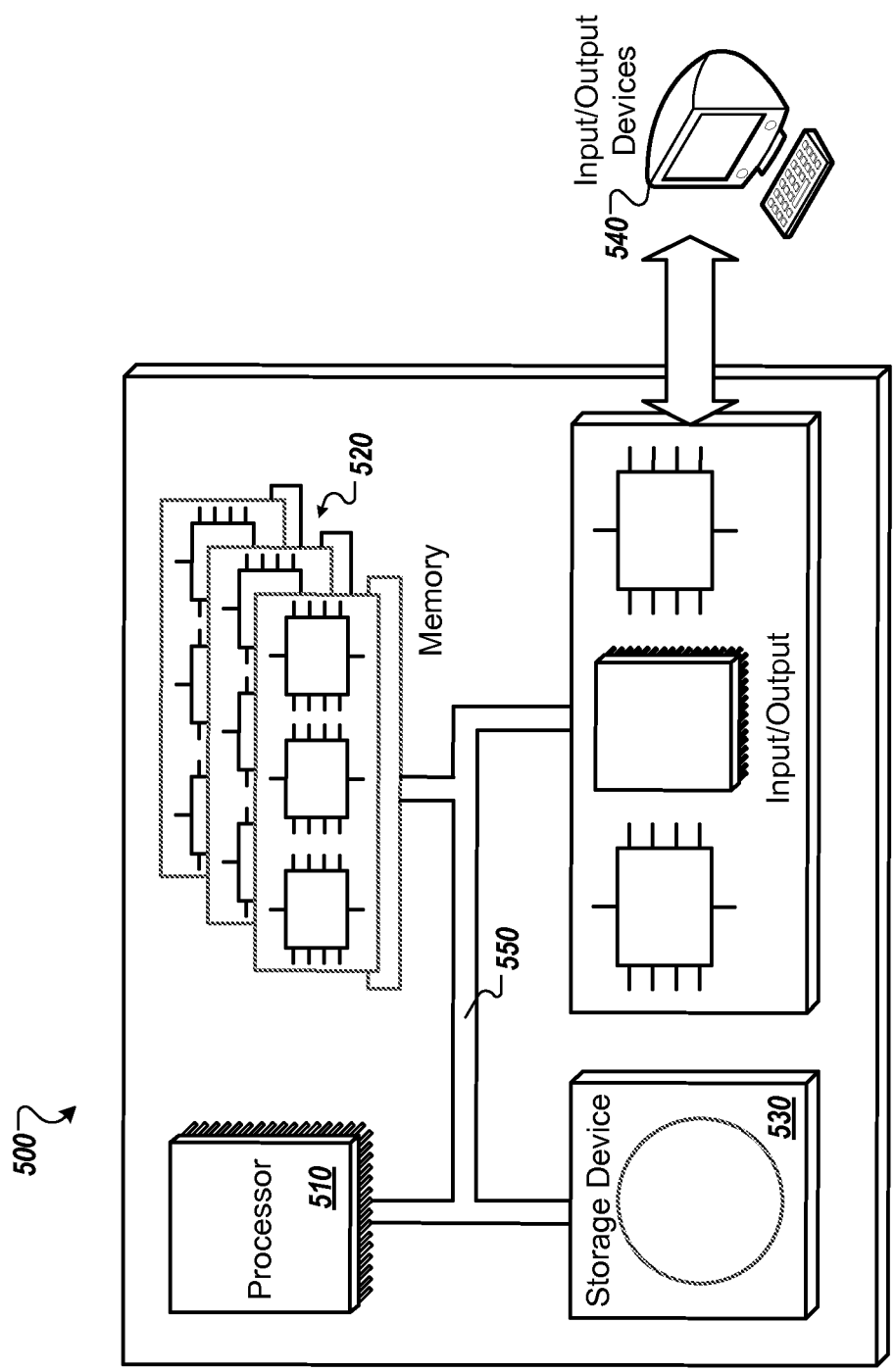
FIG. 5 shows an example computer system.

FIG. 5 shows an example of a computer system 500. The system 500 can be used for the operations described in association with any of the computer-implement methods described previously, according to one implementation. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
identifying, in web code to be served to a client device, presence of code for generating a form;
generating additional, executable code to be run on the client device, the additional, executable code being arranged, when executed on the client device, to:
(i) identify user input on the client device that is directed to a first field of the form, and
(ii) re-direct user-entered characters indicated by the user input into a plurality of alternative fields of the form, including at least one field other than the first field, so as to cause at least some of the user-entered characters indicated by the user input to be received in different ones of the plurality of alternative fields, including causing at least one of the user-entered characters to be received, not in the first field, but instead in the at least one field other than the first field;
providing, to the client device, the web code and the additional, executable code that is to be run on the client device;
receiving a request from the client device based on completion of first user input into the form; and
combining separate pieces of data in the received request, that respectively indicate the respective user-entered characters that were re-directed into respective fields among the plurality of alternative fields, into a single piece of data that is associated with the first field of the form for processing by a web server system that initially generated the web code.

2. The computer-implemented method of claim 1, wherein the additional, executable code is generated by an intermediary security server system located between the web server system and the Internet, and that intercepts data served from and requests provided to the web server system.

3. The computer-implemented method of claim 1, wherein identifying the presence of code for generating the form comprises parsing HTML code generated by the web server system.

4. The computer-implemented method of claim 1, wherein identifying the presence of code for generating the form comprises at least partially rendering a web page represented by the web code, and analyzing a document object model (DOM) generated by the at least partial rendering of the web page.

5. The computer-implemented method of claim 1, wherein the plurality of alternative fields includes a hidden field that is not visible to a user of the client device when the web code is executed for presentation to the user of the client device.

6. The computer-implemented method of claim 5, wherein the additional, executable code is further arranged to encrypt the user-entered characters received in the plurality of alternative fields before transmitting the request.

7. The computer-implemented method of claim 1, wherein combining the separate pieces of data in the received request comprises identifying data for performing a reverse transformation on the separate pieces of data in the received request, wherein the reverse transformation corresponds to a transformation that was dictated by the additional, executable code.

8. The computer-implemented method of claim 1, wherein:
the client device is a first client device, and
the method further comprises serving code for generating the form and additional, executable code to a second client device, wherein the additional executable code served to the second client device is arranged to modify the form in a different manner than was the additional, executable code that was served to the first client device.

9. The computer-implemented method of claim 1, wherein the additional, executable code is further arranged, when executed on the client device, to dynamically generate the plurality of alternative fields at the client device in response to identifying that the user input is directed to the first field of the form.

10. The computer-implemented method of claim 1, wherein none of the plurality of alternative fields includes the first field.

11. The computer-implemented method of claim 1, wherein the additional, executable code is further arranged to re-direct the user-entered characters indicated by the user input into the plurality of alternative fields by directing characters from different portions of the user input into different ones of the plurality of alternative fields.

12. The computer-implemented method of claim 1, further comprising, for each of a plurality of client devices, receiving an indication that the web code is to be served to the respective client device, and generating a respective instance of the additional, executable code to be run on the respective client device,
wherein the respective instances of the additional, executable code are each arranged when executed on a respective client device, to re-direct user-entered characters indicated by respective user inputs at the respective client devices into alternative fields in a different manner, including at least one of
(i) generating different combinations of alternative fields for the first field of the form at each of the plurality of client devices,
(ii) splitting user input directed to the first field into alternative fields differently at each of the plurality of client devices, or
(iii) encrypting user input that is re-directed to alternative fields differently at each of the plurality of client devices.

13. The computer-implemented method of claim 1, wherein the additional, executable code is further arranged to determine whether input at the client device is likely user input or is likely automated input, and to re-direct characters indicated by the input into the plurality of alternative fields in response to determining that the input is likely user input, but to not re-direct characters indicated by the input into the plurality of alternative fields in response to determining that the input is likely automated input.

14. The computer-implemented method of claim 1, further comprising inserting into the web code the additional, executable code to create modified web code,
wherein providing the web code and the additional, executable code to the client device comprises providing the modified web code to the client device.

15. The computer-implemented method of claim 1, wherein:
the plurality of alternative fields do not include the first field of the form; and
the additional, executable code is further arranged, when executed on the client device, to insert dummy characters into the first field of the form in response to identifying the user input on the client device that is directed to the first field of the form.

16. The computer-implemented method of claim 15, wherein the dummy characters comprise a series of randomly generated characters that do not match the user-entered characters indicated by the user input.

17. A computer-implemented system, comprising:
one or more computer processors; and
one or more tangible storage devices accessible by the one or more processors and storing instructions that, when executed, perform operations that include:
identifying, in web code to be served to a client device, presence of code for generating a form;
generating additional, executable code to be run on the client device, the additional, executable code being arranged, when executed on the client device, to:
(i) identify user input on the client device that is directed to a first field of the form, and
(ii) re-direct user-entered characters indicated by the user input into a plurality of alternative fields of the form, including at least one field other than the first field, so as to cause at least some of the user-entered characters indicated by the user input to be received in different ones of the plurality of alternative fields, including causing at least one of the user-entered characters to be received, not in the first field, but instead in the at least one field other than the first field;
providing, to the client device, the web code and the additional, executable code that is to be run on the client device;
receiving a request from the client device based on completion of first user input into the form; and
combining separate pieces of data in the received request, that respectively indicate the respective user-entered characters that were re-directed into respective fields among the plurality of alternative fields, into a single piece of data that is associated with the first field of the form for processing by a web server system that initially generated the web code.

18. The computer-implemented system of claim 17, wherein the additional, executable code is generated by an intermediary security server system located between the web server system and the Internet, and that intercepts data served from and requests provided to the web server system.

19. The computer-implemented system of claim 17, wherein the plurality of alternative fields includes a hidden field that is not visible to a user of the client device when the web code is executed for presentation to the user of the client device.

20. The computer-implemented system of claim 19, wherein the additional, executable code is further arranged to encrypt the user-entered characters received in the plurality of alternative fields before transmitting the request.

21. The computer-implemented system of claim 17, wherein combining the separate pieces of data in the received request comprises identifying data for performing a reverse transformation on the separate pieces of data in the received request, wherein the reverse transformation corresponds to a transformation that was dictated by the additional, executable code.

22. The computer-implemented system of claim 17, wherein:
the client device is a first client device, and
the operations further comprise serving code for generating the form and additional, executable code to a second client device, wherein the additional executable code served to the second client device is arranged to modify the form in a different manner than was the additional, executable code that was served to the first client device.

23. One or more non-transitory computer-readable devices having instructions stored thereon that, when executed by one or more processors, cause performance of operations comprising:

identifying, in web code to be served to a client device, presence of code for generating a form;

generating additional, executable code to be run on the client device, the additional, executable code being arranged, when executed on the client device, to:
(i) identify user input on the client device that is directed to a first field of the form, and
(ii) re-direct user-entered characters indicated by the user input into a plurality of alternative fields of the form, including at least one field other than the first field, so as to cause at least some of the user-entered characters indicated by the user input to be received in different ones of the plurality of alternative fields, including causing at least one of the user-entered characters to be received, not in the first field, but instead in the at least one field other than the first field;

providing, to the client device, the web code and the additional, executable code that is to be run on the client device;

receiving a request from the client device based on completion of first user input into the form; and combining separate pieces of data in the received request, that respectively indicate the respective user-entered characters that were re-directed into respective fields among the plurality of alternative fields, into a single piece of data that is associated with the first field of the form for processing by a web server system that initially generated the web code.

* * * * *